(12) United States Patent
Bi et al.

(10) Patent No.: US 7,587,206 B2
(45) Date of Patent: Sep. 8, 2009

(54) PROVIDING OVERLOAD CONTROL IN RELATIVELY HIGH-SPEED WIRELESS DATA NETWORKS

(75) Inventors: Qi Bi, Morris Plains, NJ (US); Thomas Mathew, Whippany, NY (US); Stanley Vitebsky, Morristown, NJ (US); Yang Yang, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 29 days.

(21) Appl. No.: 11/213,322

(22) Filed: Aug. 26, 2005

(65) Prior Publication Data
US 2007/0077938 A1    Apr. 5, 2007

(51) Int. Cl.
H04W 72/00    (2009.01)
(52) U.S. Cl. .............. 455/453; 455/450; 455/67.13; 455/67.11; 455/69; 455/70; 370/322; 370/329; 370/341; 370/348
(58) Field of Classification Search ............ 455/450, 455/453, 67.13, 67.11, 69, 70; 370/322, 370/329, 341, 348, 395.21
See application file for complete search history.

(56) References Cited

U.S. PATENT DOCUMENTS

| | | | | |
|---|---|---|---|---|
| 5,594,720 | A * | 1/1997 | Papadopoulos et al. | 370/330 |
| 6,016,311 | A * | 1/2000 | Gilbert et al. | 370/280 |
| 6,240,287 | B1 | 5/2001 | Cheng et al. | |
| 6,961,542 | B2 * | 11/2005 | Voyer | 455/67.11 |
| 2002/0141349 | A1 * | 10/2002 | Kim et al. | 370/252 |
| 2003/0228871 | A1 * | 12/2003 | Bernhard et al. | 455/452.2 |
| 2004/0185868 | A1 * | 9/2004 | Jain et al. | 455/453 |
| 2005/0026624 | A1 * | 2/2005 | Gandhi et al. | 455/453 |
| 2005/0107090 | A1 * | 5/2005 | Hosein | 455/453 |
| 2005/0124369 | A1 * | 6/2005 | Attar et al. | 455/522 |
| 2006/0045045 | A1 * | 3/2006 | Blessent et al. | 370/328 |
| 2006/0215608 | A1 * | 9/2006 | Lee et al. | 370/331 |
| 2006/0233110 | A1 * | 10/2006 | Yang et al. | 370/237 |

OTHER PUBLICATIONS

Mingxi Fan, et al. "The Impact of Antenna-array Receivers on the Reverse Link Performance of CDMA2000 IxEV High Rate Packet Data Systems" VTC, Inc., 2003.
Tara Javidi "Decentralized Rate Assignments in a Multi-Sector CDMA System" Electrical Engineering, IEEE, Globecom,, 2003.
Jennifer Price, et al. "Decentralized and Fair Rate Control in a Multi-Sector CDMA System" Electrical Engineering, WCNC, 2004.

* cited by examiner

Primary Examiner—Rafael Pérez-Gutiérrez
Assistant Examiner—Nimesh Patel

(57) ABSTRACT

The present invention provides a method and an apparatus for controlling a radio frequency resource between a first and a second wireless unit and a base station to provide overload control of the radio frequency resource based on an estimate thereof. For example, when feedback information is unavailable for the radio frequency resource at the base station. The method includes estimating the radio frequency resource used by the first and second wireless units in a wireless data network. The method further includes providing an overload control at the base station based on the estimated radio frequency resource. Based on this estimated radio frequency resource, a command may be issued by the base station on a reverse link. For example, a rise over thermal resource may be estimated to issue a rate control command to a wireless unit. By providing a desired timely rate control command on the reverse link, the base station may control a data rate of the wireless unit, maximizing throughput of the reverse link. In this way, a base station may control a rise over thermal resource metric to relieve an overload condition at the base station in a relatively high-speed wireless data network.

15 Claims, 5 Drawing Sheets

PROVIDING OVERLOAD CONTROL IN RELATIVELY HIGH-SPEED WIRELESS DATA NETWORKS

FIELD OF THE INVENTION

This invention relates generally to telecommunications, and more particularly, to wireless communications.

DESCRIPTION OF THE RELATED ART

Wireless communications systems or mobile telecommunication systems typically provide different types of services to different users or subscribers of wireless communication devices. The wireless communication devices may be mobile or fixed units and situated within a geographic region across one or more wireless networks. The users or subscribers of wireless units or communication devices, such as mobile stations (MSs) or access terminals or user equipment may constantly move within (and outside) particular wireless networks. A wireless unit may encompass additional features and applications than typically available on a conventional cellular phone. Examples of different features and applications include e-mail service, Internet access, audio-video interfaces for music and media content streaming.

A wireless communications system generally includes one or more base stations (BSs) that can establish wireless communications links with wireless units. Each wireless unit has an active set, which comprises a set of base stations with which it may communicate. Base stations may also be referred to as node-Bs or access networks. To form the wireless communications link between a wireless unit and a base station, the wireless unit accesses a list of available channels (or carriers) broadcast by the base station. To this end, a wireless communications system, such as a spread spectrum wireless communications system, may allow multiple users to transmit simultaneously within the same wideband radio channel, enabling a frequency re-use based on a spread spectrum technique.

In many cellular networks, higher data rates and stringent Quality of Service (QoS) requirements demand an improved management of radio frequency (RF) resources, such as a rise over thermal (RoT) resource. In a rate-controlled wireless data system, a user can transmit at a different data rate based on a local radio frequency (RF) condition and a traffic demand, causing a dynamic RoT at a receiver of the base station. On the reverse link of a wireless data communications system, such as 1xEV-DO, the RoT resource is shared by all active users served by a sector.

With the dynamic RoT resource that is shared across many active users, maintaining a desired system stability level and user performance becomes difficult since the RoT may exceed a certain level. The active users that share the RoT resource may continue to communicate with a base station using different data rates. As a result, an overload condition may occur at the base station.

To relieve an overload condition, the noise rise at the wireless units that share the RoT resource may be monitored continuously and corresponding information may be fed back to control circuitry at a base station to generate rate control commands. In a high-speed wireless data communications system, however, the frequency of a rate control command can be quite high while the time resolution of the RoT feedback information from a radio often is limited due to RF system design complexity. These limitations generally result in inadequate and/or ineffective overload control. Such overload control greatly degrades system throughput.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one illustrative embodiment of the present invention, a method is provided for controlling a radio frequency resource between a first and a second wireless unit and a base station. The method includes estimating the radio frequency resource used by the first and second wireless units. The method further includes providing an overload control at the base station based on the estimated radio frequency resource.

BRIEF DESCRIPTION OF THE DRAWINGS

The invention may be understood by reference to the following description taken in conjunction with the accompanying drawings, in which like reference numerals identify like elements, and in which.

Figure 1:
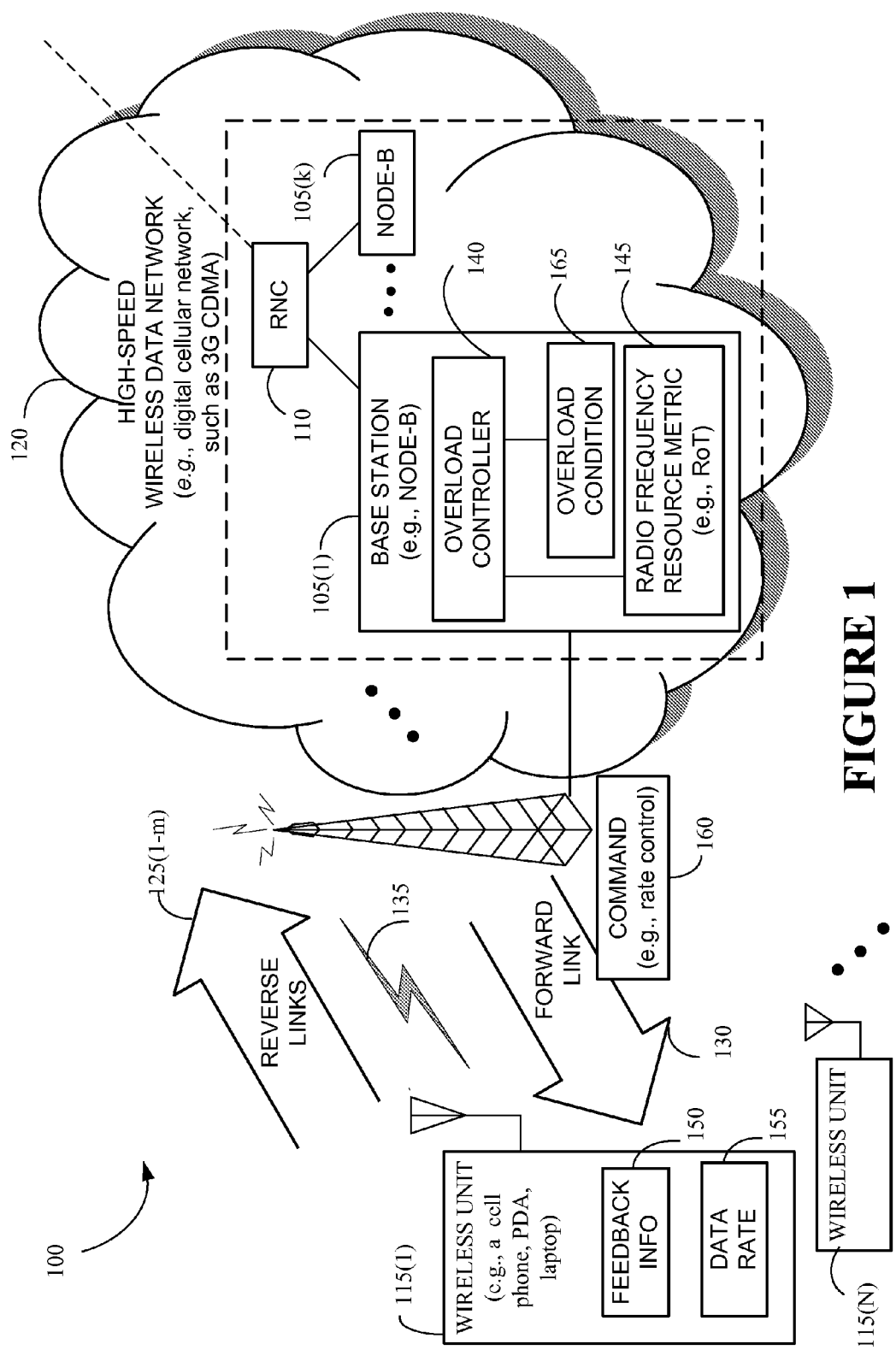
FIG. 1 schematically depicts a communications system, which includes first and second base stations that may provide overload control of radio frequency resources based on estimates thereof according to one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus are provided for wireless communication between a wireless unit, such as a mobile station and a base station associated with a relatively high-speed wireless data network to provide overload control of radio frequency resources based on estimates thereof. Such estimates may refer to a prediction of a radio frequency resource when actual data for that resource is unavailable from a monitoring circuitry. When the actual data becomes available using a feedback loop, an estimate may be fine-tuned and errors in the prediction of the resource may be corrected. The method includes estimating a radio frequency resource, which a mobile user shares with at least one another mobile user associated with the network, when feedback information is unavailable for the radio frequency resource. The method further includes providing overload control of the radio frequency resource at the base station based on at least one estimate thereof. Based on this estimated radio frequency resource, a command may be issued on a forward link. For example, a rise over thermal (RoT) resource may be selectively estimated to issue a rate control command. By controlling a RoT resource metric when the feedback information is unavailable at a base station, a controller may enable a wireless unit to transmit at a relatively higher data rate after the controller causes another wireless unit to reduce the data rate based on the rate control command. Using an adaptive feedback loop, the controller may provide a desired timely rate control. The controller may use a self-correction control to synchronize estimation of the RoT resource with a measurement thereof to optimize throughput performance of a reverse link. In this way, a base station may control the RoT resource to relieve an overload condition at a base station.

Referring to FIG. 1, a communications system 100 is illustrated to include first and second base stations (BSs) 105(1-$k$) that may provide overload control of radio frequency resources according to one illustrative embodiment of the present invention. In the communications system 100, the first and second base stations 105(1-$k$) may provide the wireless connectivity to a plurality of wireless units, such as mobile stations (MSs) 115(1-N) according to any desirable protocol. Examples of such a protocol include a Code Division Multiple Access (CDMA, cdma2000) protocol, an Evolved Data Optimized (EVDO, 1XEVDO) protocol, a Universal Mobile Telecommunication System (UMTS) protocol, a Global System for Mobile communications (GSM) protocol, and like.

A radio network controller (RNC) 110 may be coupled to the first and second base stations 105(1-$k$) to enable mobile users of the plurality of wireless units 115(1-N) to communicate over a relatively high-speed wireless data network 120, such as a cellular network. By controlling a radio frequency resource, such as a rise over thermal (RoT) resource between at least two wireless units 115(1), 115(N) and a base station, e.g., the first base station 105(1) overload control may be provided based on an estimate of the RoT resource. For example, overload associated with data rates the two wireless units 115(1), 115(N) may be provided when feedback is unavailable for the RoT resource at the first base station 105(1).

One example of the high-speed wireless data network 120 includes a digital cellular network based on a CDMA protocol, such as specified by the 3rd Generation (3G) Partnership Project (3GPP) specifications. The 3G cellular systems provide enhanced voice capacity and support high data rate packet based services. These features are provided in cdma2000 1xEV high rate packet data air system referred to as IS-856. The 3G cellular system cdma2000 1xEV provides high-speed wireless Internet access to mobile users with asymmetric data traffic relative to a cellular system based on IS-95 standard. For example, data rate of a user of the wireless unit 115(1) may very from 9.6 kbps to 153.6 kbps.

Other examples of such a protocol include a 1xEV-DO protocol, a UMTS protocol, a GSM protocol, and like. The radio network controller 110 may manage exchange of wireless communications between the plurality of wireless units 115(1-N) and the first and second base stations 105(1-$k$) according to one illustrative embodiment of the present invention. Although two base stations 105(1-$k$) and one radio network controller 110 are shown in FIG. 1, persons of ordinary skill in the pertinent art having benefit of the present disclosure should appreciate that any desirable number of base stations 105 and radio network controllers 110 may be used.

Each of the first and second base stations 105(1-$k$), sometimes referred to as Node-Bs, may provide connectivity to associated geographical areas within the high-speed wireless data network 120. Although the high-speed wireless data network 120 is shown to include the first and second base stations 105(1-$k$) coupled to the radio network controller 110 in FIG. 1, persons of ordinary skill in the art should appreciate that portions of the high-speed wireless data network 120 may be suitably implemented in any number of ways to include other components using hardware, software, or a combination thereof. High-speed wireless data networks are known to persons of ordinary skill in the art and so, in the interest of clarity, only those aspects of the high-speed wireless data network 120 that are relevant to the present invention will be described herein.

Examples of the wireless units 115(1-N) may include a host of wireless communication devices including, but not limited to, cellular telephones, personal digital assistants (PDAs), and global positioning systems (GPS) that employ the spread spectrum communications system 100 to operate in the high-speed wireless data network 120. Other examples of the wireless unit 115 may include smart phones, text messaging devices, and the like.

Consistent with one embodiment, the wireless unit 115(1) may transmit messages to the first base station 105(1) over a first reverse link 125(1) and the wireless unit 115(N) to over a second reverse link 125($m$). A single forward link 130 may provide messages to the wireless unit 115(1). The messages may include traffic packets and signaling messages.

In the communications system 100, mobile communications that communicate the messages between the first and second base stations 105(1-$k$) and the wireless unit 115(1) may occur over an air interface 135 via a radio frequency (RF) medium that uses a code division multiple access (CDMA) protocol to support multiple users. When moving within the high-speed wireless data network 120, such as a digital cellular CDMA network, a handover of mobile communications occurs for the wireless unit 115(1) upon a user leaving an area of responsibility of a first cell, namely, into a new cell. This handover may be coordinated by the radio network controller 110.

According to one illustrative embodiment of the present invention, the first base station 105(1) may comprise a controller 140 that controls overhead at the first base station 105(1). The controller 140 may be suitably implemented in any number of ways using hardware, software, or a combination thereof. Specifically, the controller 140 may estimate a radio frequency resource, such as a rise over thermal (RoT) resource metric 145, when feedback information 150 is unavailable for the estimated radio frequency resource. A user of the wireless unit 115(1) shares the RoT resource metric 145 with at least one another user, e.g., that of the wireless unit 115(N) associated with the high-speed wireless data network 120.

In operation, the controller 140 may provide overload control at the first base station 105(1) based on the estimated radio frequency resource. For example, to provide overload control at the first base station 105(1), the controller may control a data rate 155 of transmission of traffic packets from the wireless unit 115(1). For the purposes of controlling the data rate 155 for the wireless unit 115(1) when the feedback information 150 for the radio frequency resource, e.g., the RoT resource metric 145 is unavailable at the first base station 105(1), the controller 140 may issue a command 160 on the forward link 130.

In this way, the controller 140 may control the rise over thermal resource to relieve an overload condition 165 at the first base station 105(1). By providing a desired timely rate control command(s), for example, on the forward link 130 to control the data rate 155 of the wireless unit 115(1), the first base station 105(1) may maximize throughput of the first reverse link 125(1). Accordingly, the controller 140 may significantly increase system stability and user performance in the communications system 100.

However, persons of ordinary skill in the art having benefit of the present disclosure should appreciate that the present invention is not limited to the RoT resource metric 145, the data rate 155, and throughput of the first reverse link 125(1). In alternative embodiments, the controller 140 may enable the first base station 105(1) to provide different capabilities and/or additional capabilities to control the overload condition 165.

As used herein, the term "throughput of the first reverse link 125(1)" refers to availability of one or more radio resources, such as radio frequency (RF) resources, that may be used to form a reverse link, as well as the various features that may be provided to the wireless unit 115(1) and other wireless units, e.g., 115(N) by the first base station 105(1). For example, the controller 140 may enable the wireless unit 115(N) to transmit at a relatively higher data rate after reducing the data rate 155 of the wireless unit 115(1).

According to one embodiment, the wireless unit 115(1) may transmit messages or signals to one or more active base stations using one or more associated reverse links. Pseudo noise offsets (PN offsets) associated with each of the active base stations are included in an active set list, which is typically stored by the radio network controller 110 coupled to the first and second base stations 105(1-k). The wireless unit 115(1) may receive messages and/or signals over the forward link 130 between the wireless unit 115(1) and one of the active base stations, which is generally referred to as the serving base station or the serving sector. The 3rd Generation Partnership Project (3GPP) standard defines the role of a serving radio network controller based on 3GPP specifications.

Besides the messages or signals, the wireless unit 115(1) may receive traffic packets, such as data packets. Often the traffic packets include information that is intended for the user of the wireless unit 115(1). For example, traffic packets may include voice information, images, video, data requested from an Internet site, and the like. In contrast, signaling messages are used to provide information intended to be used by the wireless unit 115(1) and/or other elements of the communications system 100. Specifically, signaling messages may include configuration messages, setup instructions, switch instructions, handoff instructions, and the like.

The wireless unit 115 may request a handoff by sending a signaling message, such as an update message, to the radio network controller 110. For example, the wireless unit 115 may request that the second base station 105(k) be added to, or removed from, an active set list maintained in the radio network controller 110. A request is forwarded by one or more of the base stations 105 to the radio network controller 110, which may process the request to remove the first base station 105(1) from the active set and then forward a channel assignment message to the serving base station 105(k).

The wireless unit 115(1) may move across overlapping coverage zones referred to as cells of base stations 105. However, the wireless unit 115(1) may communicate simultaneously to two or more cells, or in some cases with two sectors on the same cell, permitting a call to continue even though the signal from any one cell would not be strong enough to keep the call up.

Figure 2:
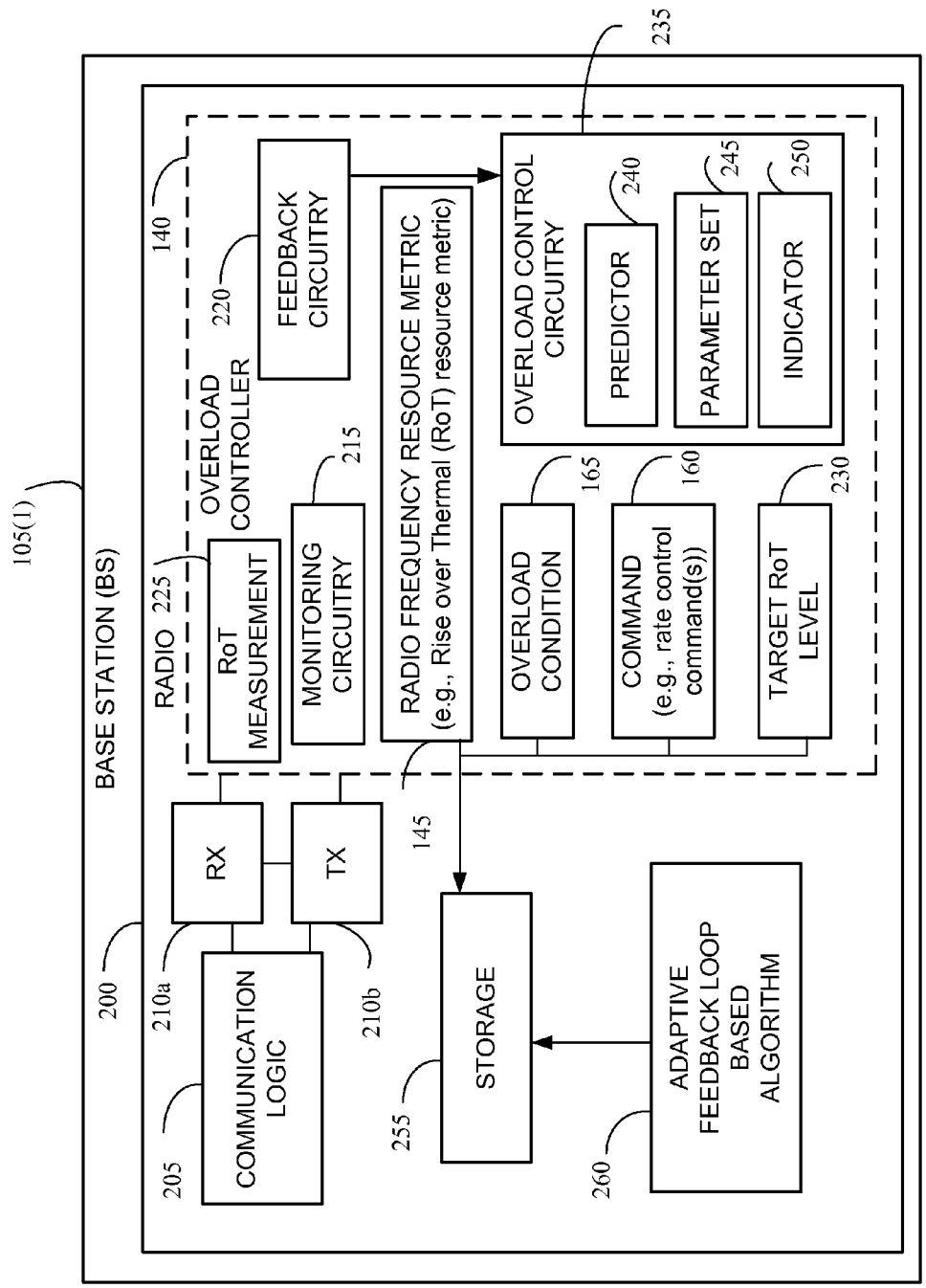
FIG. 2 schematically depicts the first base station to include the controller shown in FIG. 1 for relieving an overload condition in accordance with one illustrative embodiment of the present invention.

Referring to FIG. 2, the first base station 105(1) is depicted to include the controller 140 shown in FIG. 1 for relieving the overload condition 165 in accordance with one illustrative embodiment of the present invention. The first base station 105(1) comprises a radio 200 that includes a communication logic 205 coupled to a receiver (RX) 210a and transmitter (TX) 210b that enable the controller 140 to form wireless communication links including the first reverse link 125(1) with the wireless unit 115(1) and the forward link 130 thereto. In one embodiment, the first reverse link 125(1) and the forward link 130 may be established on a plurality of channels. The channels, such as traffic and control channels may be associated with separate channel frequencies. For example, CDMA channels with associated channel number and frequency may form a wireless communication link for transmission of high-speed data.

The controller 140 may comprise monitoring circuitry 215 to monitor the RoT resource metric 145 to obtain the feedback information 150. The controller 140 may further comprise feedback circuitry 220 to provide feedback for issuing the command 160, e.g., a rate control command on the forward link 130 for controlling the data rate 155 of the wireless unit 115(1). To determine whether a measurement 225 of the RoT resource metric 145 exceeds a target level 230 thereof, the controller 140 may measure the RoT resource.

The controller 140 may further comprise overload control circuitry 235 that includes a predictor 240, which may estimate the RoT resource metric 145 when the feedback information 150 is unavailable at the first base station 105(1). The overload control circuitry 235 may update a parameter set 245 in response to receiving next feedback information of the RoT resource metric 145. The overload control circuitry 235 may use a self-correction control to synchronize estimation of the RoT resource metric 145 with the measurement 225 thereof. Based on such a self-correction control, the overload control circuitry 235 may optimize a throughput performance indicator 250 of the first reverse link 125(1).

More specifically, if the measurement 225 of the RoT resource exceeds the target level 230 set therefor, the overload control circuitry 235 may issue a rate control command on the forward link 130 to the wireless unit 115(N) of another user of an active set served by a sector and a corresponding rate control command to all users of that active set. In alternate embodiment, the overload control circuitry 235 may issue on the forward link 130 a rate control command to the wireless unit 115(N) of a selected set of users and a corresponding rate control command to the remaining users of the selected set.

The radio 200 may comprise a storage 255 coupled to the controller 140 to store an adaptive feedback loop based algorithm 260. Using the adaptive feedback loop based algorithm 260, the controller 140 may provide a desired timely rate control. The adaptive feedback loop based algorithm 260 may tune at least one estimate of the RoT resource metric 145 based on the actual feedback information. For example, to tune the estimate of the RoT resource metric 145, the adaptive feedback loop based algorithm 260 may correct an error in the estimate of the rise over thermal resource.

Figure 3:
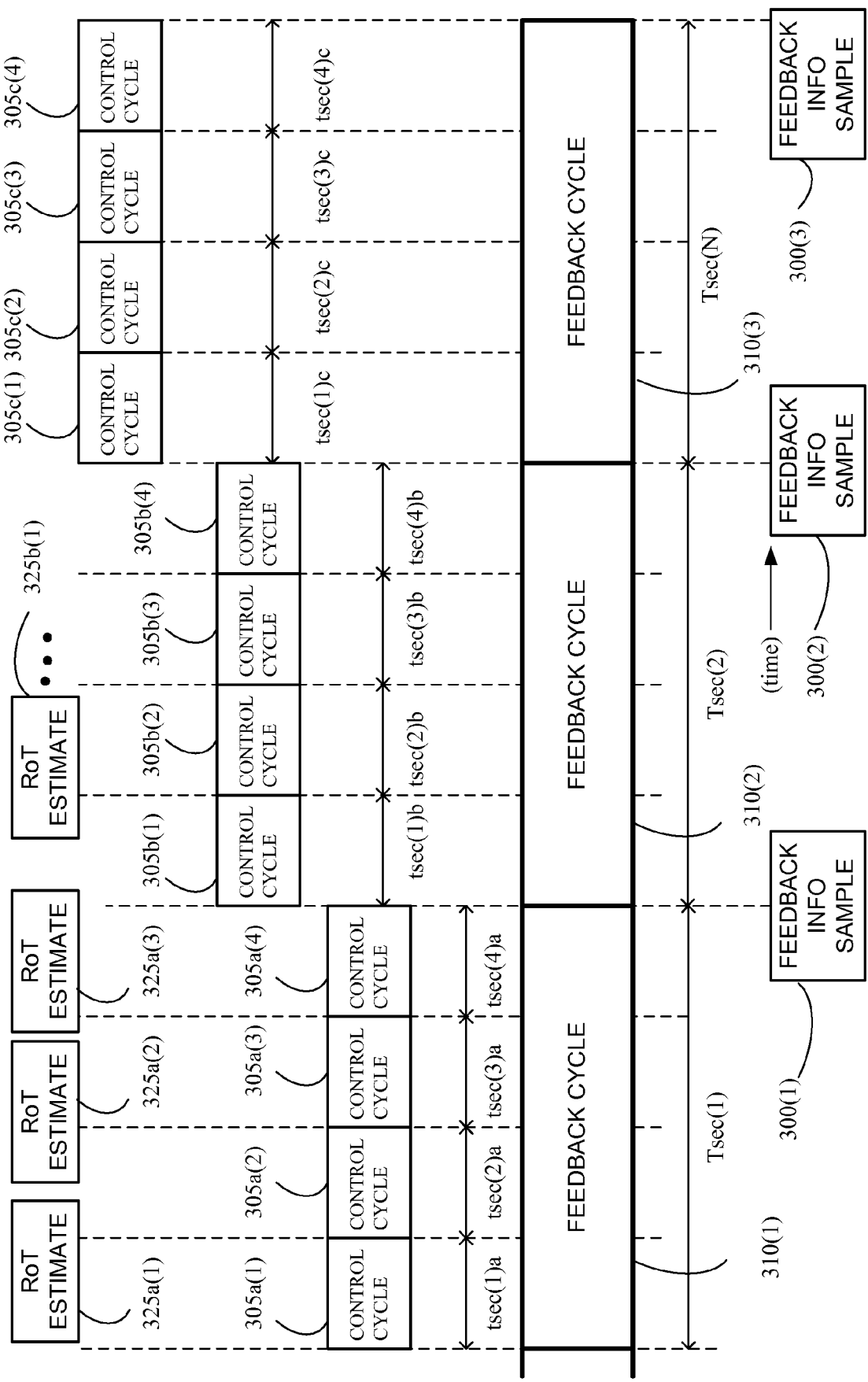
FIG. 3 depicts selective estimation of a radio frequency resource, such as a rise over thermal resource, by the controller shown in FIG. 2 based on an availability of samples of the feedback information for the rise over thermal resource metric consistent with an exemplary embodiment of the present invention.

Referring to FIG. 3, selective estimation of a radio frequency resource, such as the RoT resource is illustrated by the controller 140, based on an availability of samples 300(1-3) of the feedback information 150 for the RoT resource metric 145 in accordance with an exemplary embodiment of the present invention. As shown in FIG. 2, the overload control circuitry 235 may issue the command 160 in at least two control cycles 305 within a feedback cycle 310. To illustrate the selective estimation of the RoT resource, as an example, three feedback cycles 310(1-3) are depicted in FIG. 3 with four control cycles 305(14) each. In particular, for a first feedback cycle 310(1) of time, Tsec(1), after a first control cycle 305a(1) of time, tsec(1)a, a first RoT estimate 325a(1) is predicted by the predictor 240.

Until a first feedback information sample 300(1) becomes available at the first base station 105(1), in one embodiment, the predictor 240 estimates a second and a third RoT estimates 325a(2) and 325a(3). In other words, the predictor 240 may enable the overload control circuitry to control the RoT resource at a pace that is relatively faster than the availability of samples 300(1-3) of the feedback information 150. Accordingly, the overload control circuitry 235 may reduce the data rate 155 to a rate that provides a desired timely rate control based on the target level 230 of the RoT resource using information not limited to an availability of the samples 300(1-3) of the feedback information 150.

In accordance with one embodiment of the present invention, in each feedback cycle 310 to estimate the RoT resource metric 145, the controller 140 may follow a routine, exemplary procedures of which are illustrated below.

1. The monitoring circuitry 215 may monitor the RoT resource and provide feedback to overload control circuitry 235 in each time period, Tsec.
2. During the next Tsec, even though no RoT feedback information 150 is provided to the overload control circuitry 235, to issue a rate control command in each control cycle period, tsec, where t is much shorter than T, the overload control circuitry 235 may maintain a local predictor $RoTe(i,j)=f(RoTe(i,j-1),s(i,j-1),c(i))$ where
  i denotes the ith feedback cycle 310 of RoT feedback information 150, and j denotes the jth command cycle of ith feedback cycle 310 the overload control circuitry 235 happens to be in.
  RoT(i,j−1) refers to estimated RoT 325 in a control cycle 305 (i,j−1),
  s(i,j−1) is a set of state variables that may be provided to the predictor 240 at the previous control cycle (i,j−1). Examples of viable (but not limited to) state variables are the control command issued by the first base station 105(1) in a control cycle (i,j−1) and the throughput received by a base station, such as the first base station 105(1), in a control cycle (i,j−1).
  c(i,j−1) is the set of coefficients that may used in the RoT prediction.
  f(.) represents an auto-regression prediction function for the RoT resource, which may take different formats based on a specific rate control mechanism employed in the communications system 100 and parameters selected to use in the parameter set 245.
3. For each control cycle j in the feedback cycle i, the first base station 105(1) estimate the RoT resource based on the above predictor and issue a rate control command.
4. When the next RoT feedback information 150 arrives, the first base station 105(1) updates the parameter set c as following $c(i+1)=g(RoT(i+1),RoTe(i,N),c(i))$.

5. The first base station 105(1) may sync-up the RoT resource estimation with the measurement 225:

$RoTe(i+1,1)=RoT(i+1)$

Figure 4:
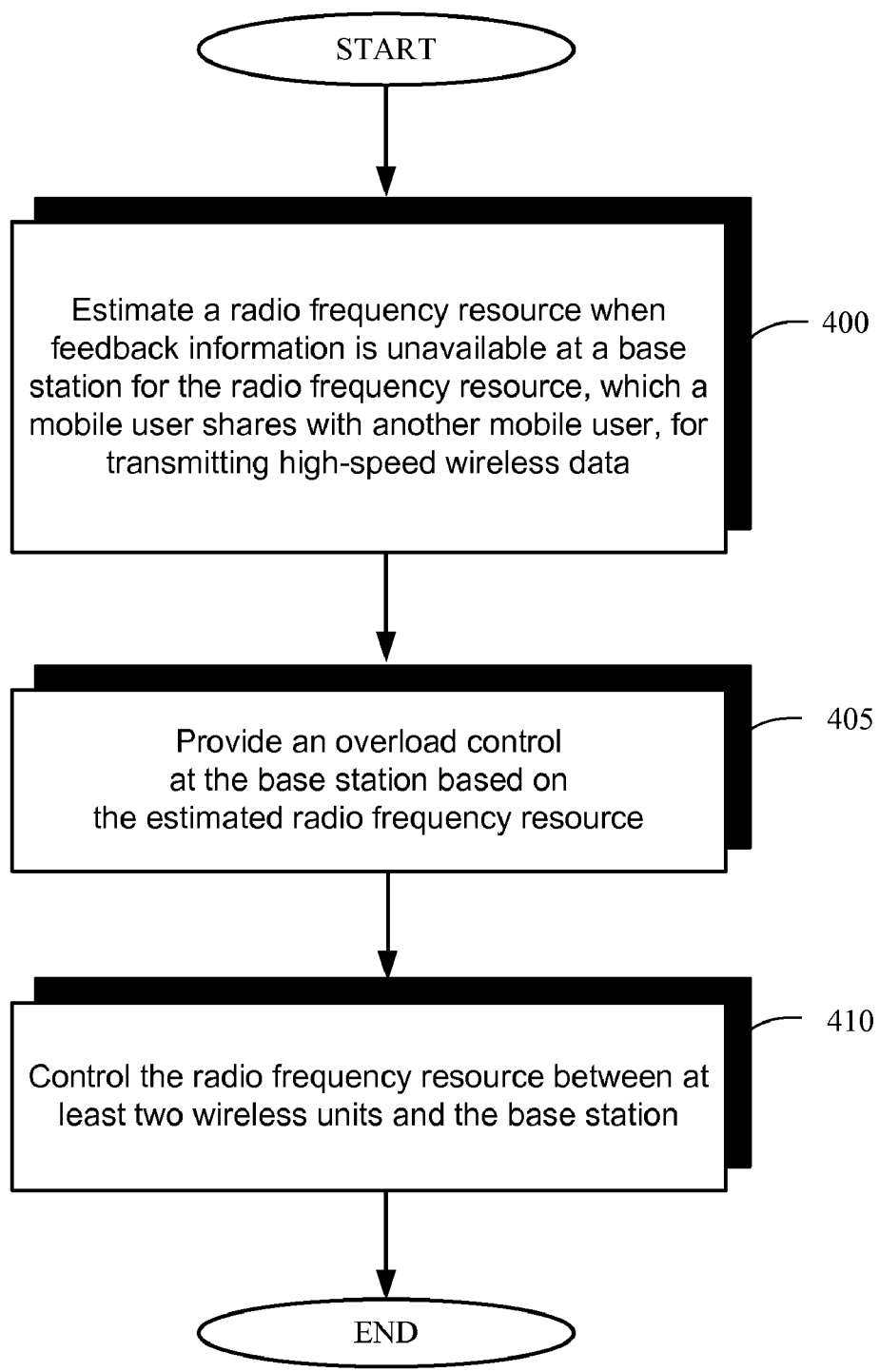
FIG. 4 illustrates a stylized representation for implementing a method of providing overload control at the first base station in the communications system shown in FIG. 1, according to one embodiment of the present invention.

Turning now to FIG. 4, a stylized representation is illustrated for implementing a method of providing overload control at the first base station 105(1) in the communications system 100, as shown in FIG. 1, according to one embodiment of the present invention. At block 400, when the feedback information 150 is unavailable for the RoT resource, the overload control circuitry 235 may use the predictor 245 to estimate, the RoT resource metric 145 shared between the user of the wireless unit 115(1) and the user of the wireless unit 115(N), at the first base station 105(1) associated with the high-speed wireless data network 120. The overload control circuitry 235 may provide overload control at the first base station 105(1) based on the estimated RoT resource, as indicated in block 405.

At block 410, the controller 140 may control the RoT resource shared between at least two wireless units 115(1) and 115(N). In this way, by timely providing a rate control command to adjust the data rate 155 based on the estimated RoT resource, the overload control circuitry 235 may relieve the overload condition 165 at the first base station 105(1). As a result, wireless communication between the wireless unit 115(1) and the first base station 105(1) may be enabled in a manner that maximizes throughput of the first reverse link 125(1) so that other users may communicate at a relatively higher rate within the communications system 100.

Figure 5:
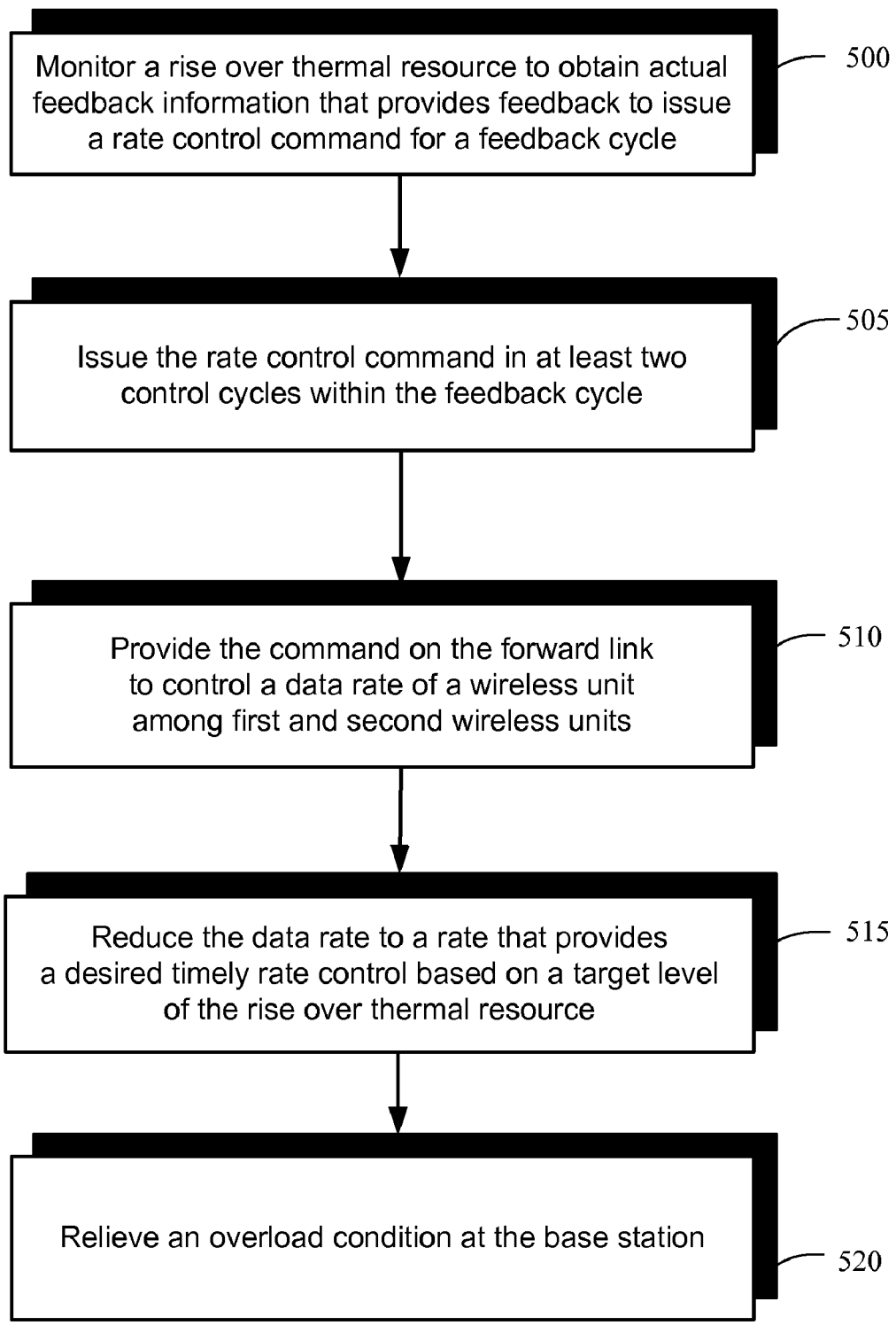
FIG. 5 illustrates a stylized representation for implementing a method of relieving the overload condition to maximize throughput of the reverse link at the first base station shown in FIG. 2 according to one illustrative embodiment of the present invention.

Finally, FIG. 5 illustrates a stylized representation for implementing a method of relieving the overload condition 165 to maximize throughput of the first reverse link 125(1) at the first base station 105(1) shown in FIG. 2 according to one illustrative embodiment of the present invention. At block 500, the monitoring circuitry 215 may monitor the RoT resource to obtain actual feedback information for each feedback cycle 310 to provide feedback for issuing a rate control command. To this end, the overload control circuitry 235 may issue the rate control command for at least two control cycles 305 within each feedback cycle 310, as set forth in block 505.

The first base station 105(1), in block 510, may provide the rate control command on the forward link 130 to control the data rate 155 of the wireless unit 115(1). The rate control command may cause the wireless unit 115(1) to reduce the data rate 155 to such a rate that provides a desired timely rate control based on the target level 230 of the RoT resource, in block 515. At block 520, the overload control circuitry 235 may cause the first base station 105(1) to control the RoT resource metric 145 in a way that relieves the overload condition 165 in the high-speed wireless data network 120 while maximizing the throughput of the first reverse link 125(1).

In one embodiment, the high-speed wireless data network 120 may wirelessly communicate mobile data at a speed and coverage desired by individual users or enterprises. According to one embodiment, the high-speed wireless data network 120 may comprise one or more data networks, such as Internet Protocol (IP) network comprising the Internet and a public telephone system (PSTN). The 3rd generation (3G) mobile communication system, namely Universal Mobile Telecommunication System (UMTS) supports multimedia services according to 3rd Generation Partnership Project (3GPP) specifications. The UMTS also referred as Wideband Code Division Multiple Access (WCDMA) includes Core Networks (CN) that are packet switched networks, e.g., IP-based networks. Because of the merging of Internet and mobile applications, the UMTS users can access both telecommunications and Internet resources. To provide an end-to-end service to users, a UMTS network may deploy a UMTS bearer service layered architecture specified by Third Generation Project Partnership (3GPP) standard. The provision of the end-to-end service is conveyed over several networks and realized by the interaction of the protocol layers.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(*a*), 802.11(*b*), 802.11(*g*), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of controlling a radio frequency resource between a wireless unit and a base station, the method comprising:
receiving at the base station information indicating the radio frequency resource used by the wireless unit, the feedback information being received at a first time during a feedback cycle and wherein the feedback cycle has a duration equal to a predetermined time interval;
estimating at the base station said radio frequency resource used by said wireless unit and the base station at a plurality of subsequent times within the feedback cycle using the feedback information indicating a rise over thermal resource at plurality of subsequent times, the plurality of subsequent times being subsequent to the first time and falling at equal intervals within the feedback cycle; and
providing a plurality of overload control signals, each overload control signal being provided in response to estimating the radio frequency resource at one of the plurality of subsequent times;
causing said base station to issue a command to provide the overload control at each of the plurality of subsequent times, wherein providing said command comprises providing said command to control a data rate of a reverse link between the wireless unit and the base station; and
relieving an overload condition, at said base station, in response to issuing the command to provide the overload control at said base station by reducing said data rate to a rate that provides a desired timely rate control based on a target level of the rise over thermal resource using information not limiting to an availability of samples of feedback information.

2. A method, as set forth in claim 1, further comprising:
using an adaptive feedback loop to provide said desired timely rate control.

3. A method, as set forth in claim 1, further comprising:
monitoring said rise over thermal resource to obtain actual feedback information that provides feedback to issue a rate control command for a feedback cycle.

4. A method, as set forth in claim 3, further comprising:
issuing said rate control command within at least two control cycles of said feedback cycle.

5. A method, as set forth in claim 3, further comprising:
tuning at least one estimate of said rise over thermal resource based on said actual feedback information.

6. A method, as set forth in claim 5, further comprising:
correcting an error in said at least one estimate of said rise over thermal resource to tune said at least one estimate.

7. A method, as set forth in claim 1, further comprising:
controlling said rise over thermal resource at a pace that is faster than a rate at which said samples of feedback information are received.

8. A method, as set forth in claim 7, further comprising:
updating a parameter set in response to receiving next feedback information of said rise over thermal resource.

9. A method, as set forth in claim 1, further comprising:
using a self-correction control to synchronize estimation of said rise over thermal resource with a measurement thereof.

10. A method, as set forth in claim 9, further comprising:
optimizing a throughput performance indicator of said reverse link based on said self-correction control.

11. A method, as set forth in claim 1, further comprising:
defining a target level for said rise over thermal resource at said base station to provide the overload control in a relatively high-speed wireless data network.

12. A method, as set forth in claim 11, further comprising:
measuring said rise over thermal resource at said base station to determine whether a measurement thereof exceeds said target level for said rise over thermal resource.

13. A method, as set forth in claim 12, further comprising:
if said measurement of said rise over thermal resource exceeds said target level thereof, issuing a rate control command to said second wireless unit associated with an active set served by a sector and a corresponding rate control command to all other wireless units of said active set.

14. A method, as set forth in claim 12, further comprising:
if said measurement of said rise over thermal resource exceeds said target level thereof, issuing rate control command to said second wireless unit of a selected set of wireless units and a corresponding rate control command to the remaining wireless units of said selected set.

15. A method, as set forth in claim 12, further comprising:
if said measurement of said rise over thermal resource exceeds said target level thereof, causing said base station to control said rise over thermal resource to relieve an overload condition for maximizing throughput of at least one reverse link.

\* \* \* \* \*